United States Patent
Zoppas et al.

(10) Patent No.: US 7,156,647 B2
(45) Date of Patent: Jan. 2, 2007

(54) DEVICE FOR COOLING AND THERMAL CONDITIONING OF A TUBULAR OBJECT

(75) Inventors: Matteo Zoppas, Fontanafredda (IT); Massimo Coran, Spresiano (IT)

(73) Assignee: S.I.P.A. Societa Industrializzazione Progettazion Automazione S.p.A., Vittorio Veneto (IT)

( * ) Notice: Subject to any disclaimer, the term of this patent is extended or adjusted under 35 U.S.C. 154(b) by 93 days.

(21) Appl. No.: 10/472,123

(22) PCT Filed: Mar. 14, 2002

(86) PCT No.: PCT/EP02/02832

§ 371 (c)(1),
(2), (4) Date: Sep. 16, 2003

(87) PCT Pub. No.: WO02/074518

PCT Pub. Date: Sep. 26, 2002

(65) Prior Publication Data

US 2004/0094869 A1   May 20, 2004

(30) Foreign Application Priority Data

Mar. 16, 2001   (IT) ........................ RM2001A0138

(51) Int. Cl.
*B29C 45/72*   (2006.01)

(52) U.S. Cl. ...................... 425/526; 264/336; 425/534; 425/547

(58) Field of Classification Search ............... 264/255, 264/336, 348, 538, 908; 425/533, 547, 526, 425/534, 556

See application file for complete search history.

(56) References Cited

U.S. PATENT DOCUMENTS

| | | | |
|---|---|---|---|
| 4,047,873 A * | 9/1977 | Farrell | 425/523 |
| 6,171,541 B1 * | 1/2001 | Neter et al. | 264/328.14 |
| 6,428,737 B1 * | 8/2002 | Collette et al. | 264/513 |
| 6,547,553 B1 * | 4/2003 | Koch et al. | 425/547 |
| 6,737,007 B1 * | 5/2004 | Neter et al. | 264/538 |
| 2003/0057598 A1 * | 3/2003 | Brand et al. | 264/237 |

FOREIGN PATENT DOCUMENTS

| | | |
|---|---|---|
| DE | 4425795 | 7/1994 |
| EP | 202973 | * 11/1986 |
| EP | 0633119 | 6/1994 |
| EP | 0718084 | 12/1995 |
| JP | 59-138417 | * 8/1984 |
| WO | WO 97/47459 | 12/1997 |
| WO | WO 02/074518 | 9/2002 |

* cited by examiner

*Primary Examiner*—Jill L. Heitbrink
(74) *Attorney, Agent, or Firm*—Sampson & Associates, P.C.

(57) ABSTRACT

A device (1) for cooling and/or thermal conditioning of hot preforms or parisons (6), in particular of parisons for the production of blow-moulded bottles made of plastic material, limits and/or reduces the deformations of said parisons during cooling by containing the transverse deformations of the end close to the opening (8) of the parison. The device is provided with a tubular portion of prolongation which wraps totally around the parison that rests on its internal surface with one of its sections (9). Described herein is the corresponding method for cooling the parison (6).

12 Claims, 7 Drawing Sheets

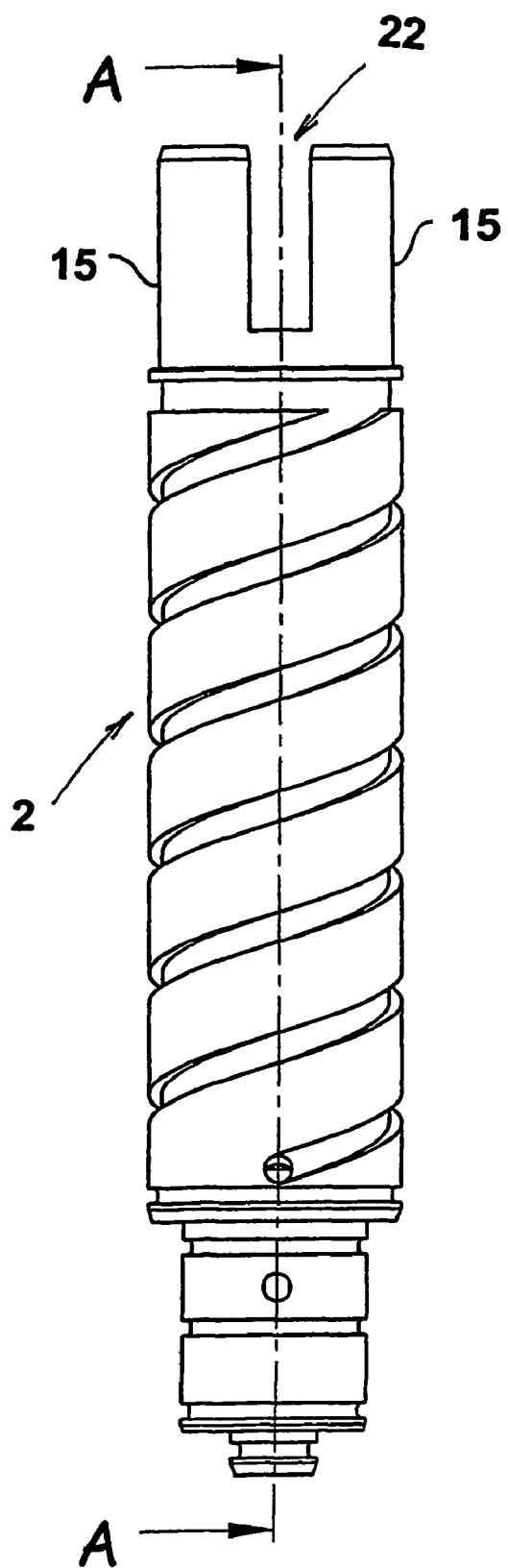
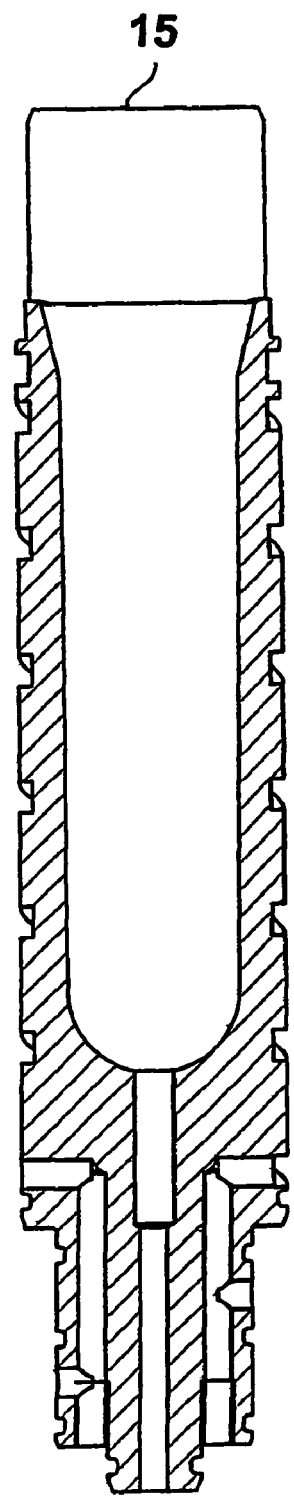
FIG. 1
FIG. 1a

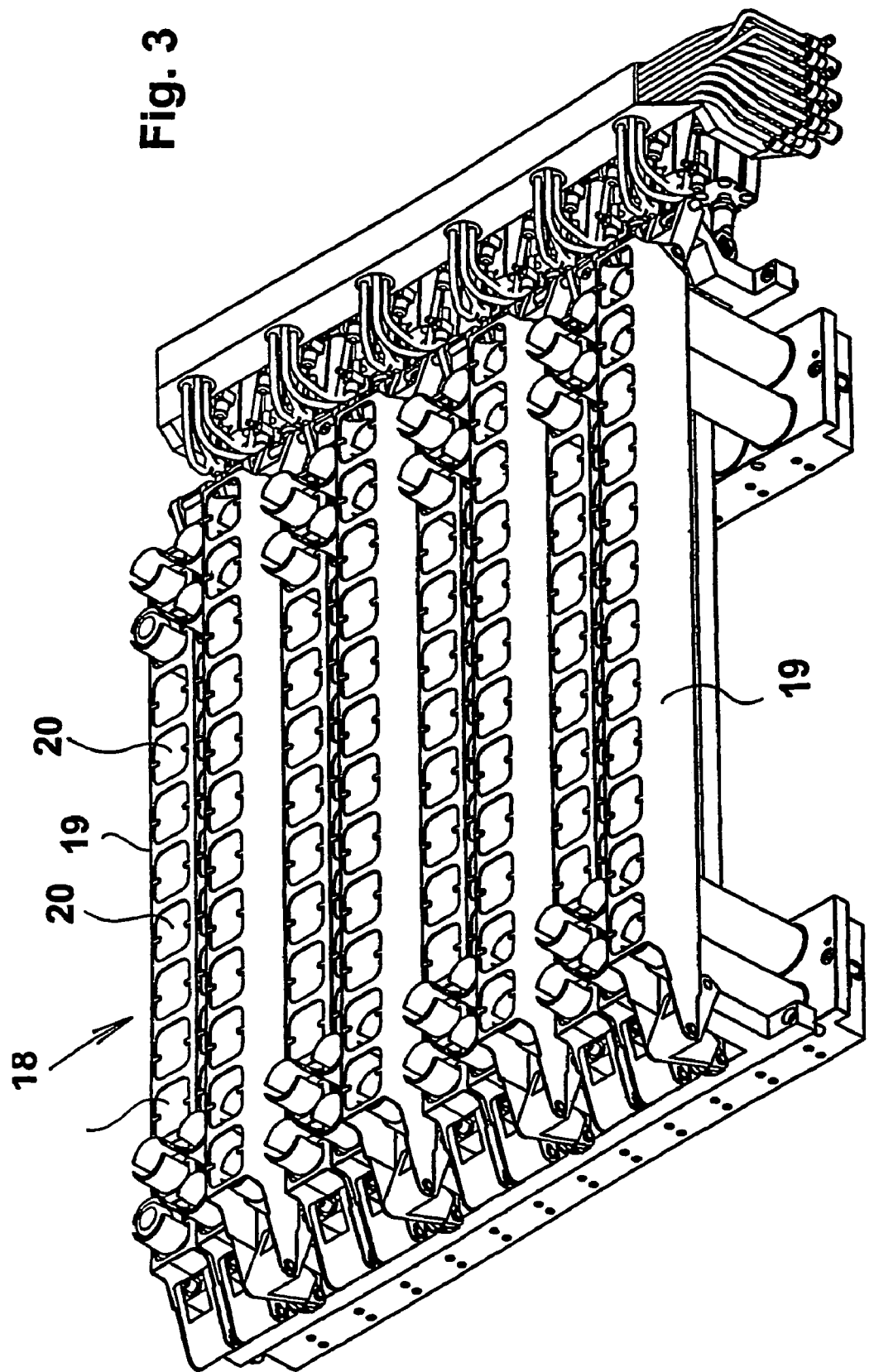

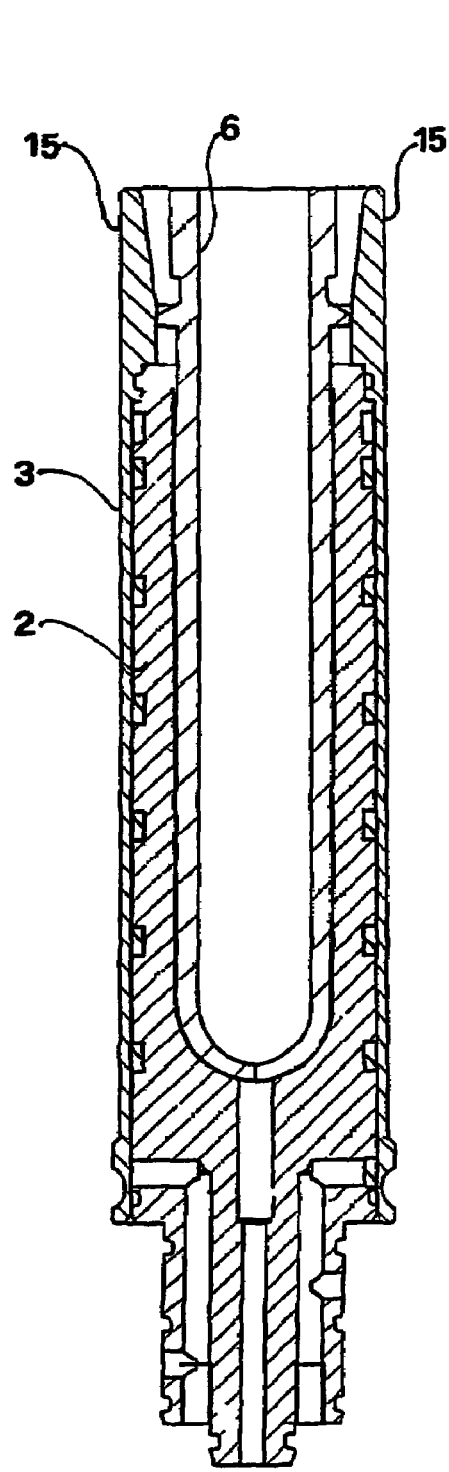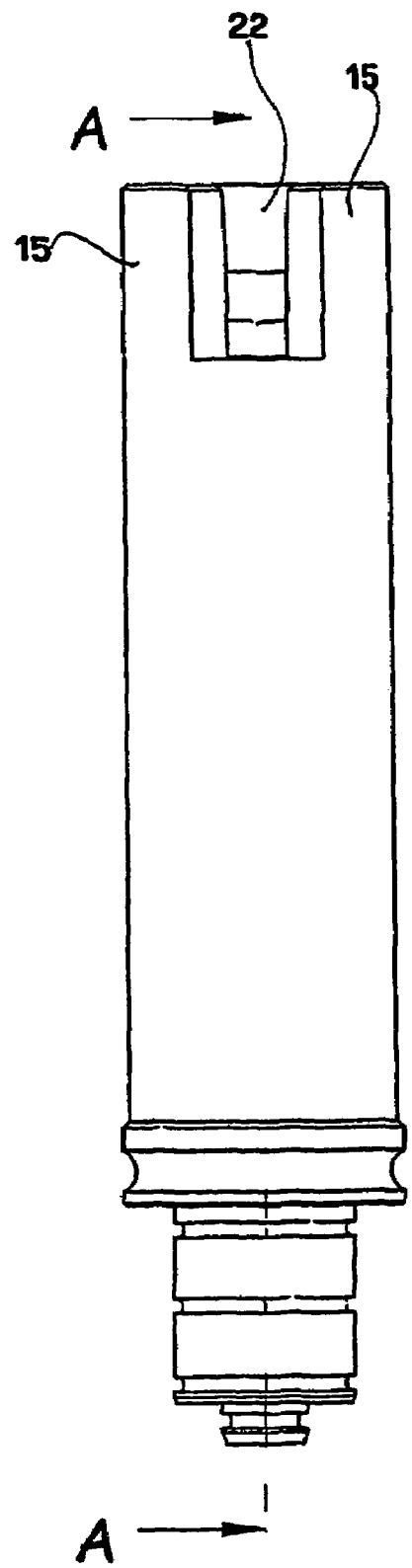
Fig. 4　　　Fig. 4a

DEVICE FOR COOLING AND THERMAL CONDITIONING OF A TUBULAR OBJECT

FIELD OF THE INVENTION

The present invention relates to a device and a method for thermal conditioning of moulded objects, and in particular thermal conditioning of tubular objects such as parisons for the production of plastic bottles by blow-moulding, reducing the deformations of the parisons upon their extraction from the injection mould.

PRIOR ART

In the production of blow-moulded bottles or containers made of plastic materials, for example bottles or jars made of PET for foodstuffs, beverages, mineral water, fruit juices, preserves, and the like, one process of fabrication is that of injection-moulding of the parisons, from which may be obtained, in a subsequent operation of stretch-blow-moulding, the finished container with even a considerable lapse of time between the production of the parison and the operation of blowing; i.e., after the injection-moulding operation, the parisons are cooled and stored, or else taken to the blow-moulding, plant, which is located in a different production site.

Cooling of the parisons can be obtained by extracting them from the injection mould when they are still hot and relatively plastic, but in any case of a consistency such that they may be gripped and transferred into special containers with circulation of coolant, known as cooling beakers or tubes or moulds, where the cooling operation is completed.

With the aim of increasing the rate of output of injection-moulding presses, one trend is that of extracting the parison from the injection mould at the highest temperature possible, but this increases all the critical aspects of manipulation of the parison on account of its considerable plasticity and susceptibility to getting damaged during transfer to the cooling devices outside the press.

Another trend is that of cooling the parison as fast as possible, both to obtain a higher productivity, and so that the plastic material of the parison will be as amorphous as possible.

In addition, according to some state-of-the-art production systems, the parison is extracted from the injection mould using various devices for mechanical gripping, for example mechanical grippers, and transferred as fast as possible into the cooling beaker. If the temperature of extraction is excessively high, and the parison excessively plasticized, the latter is deformed also by the mechanical accelerations and by the impact during handling. Consequently, a problem that can arise during this second cooling step is that the parison, on account of thermal contraction or mechanical stresses, is deformed, assuming a bent shape, even with a few millimeters of misalignment between the two ends of the parison.

This can lead to various types of problems; for example, numerous rejects during the subsequent operation of heating of the parison prior to the operation of blowing. The parison is pre-heated in an infrared furnace, the lamps or heating surfaces of which pass very dose to the parison, and owing to the excessive deformations of the latter, bang against it, or else heat it in an uneven way, so bringing about further deformations. In addition, the shape tolerances are a parameter according to which the quality and the reliability—and hence the profit—of a possible external subsupplier of parisons, and in general of any production process, whether internal or external, are measured. A further disadvantage that may occur is that a deformed parison, after the operation of stretching with as special bar gives rise, in the bottom, region of the stretched solid, to non-uniform wall thicknesses, which in the subsequent operation of blow-moulding of the bottle leads to bursts.

One method according to a current technique for preventing geometrical errors is that of inserting into the parison, which is in turn inserted into the cooling beaker, a force plug, plunger or mandrel for preventing bends from occurring, which, however, leads to the need for an additional plug-carrying plate and the movement of an additional mechanical member in the cycle time of the machine.

Other solutions have been devised for prolonging the cooling of the parison in the injection mould without delaying too much the output rate of the injection-moulding press.

A problem that the present invention seeks to solve is that of reducing or eliminating the deformations that a parison may undergo during cooling for thermal conditioning, or that it may have undergone before cooling for thermal conditioning after the injection-moulding operation is completed, with a high repeatability of the production process.

Another purpose that the present invention seeks to achieve is to simplify the state-of-the-art devices for eliminating the aforesaid deformations, for example without recourse to the use of containment plugs inside the parison in the cooling beaker.

The above purposes are achieved by a device having the characteristics according to Claim 1, and with a method having the characteristics according to Claim 16.

Advantages that are obtained by means of the present invention, in addition to the solution of the problems described above and to the implementational simplicity of the invention, are the fact of enabling extraction of the parison from the injection mould at a higher temperature with limited deformations on the cooled parison. In addition, cooling beakers according to the present invention can be replaced on already existing plants for cooling or thermal conditioning and blow-moulding, without having to make other modifications to the plant, at extremely contained costs and during a customary extraordinary maintenance operation by staff that may even be not particularly highly qualified. Some particular embodiments of the invention presented in the dependent claims regard, devices for extraction of the parison from the cooling device and/or thermal-conditioning device.

LIST OF FIGURES

Further advantages that may be achieved with the present invention will become apparent, to the person skilled in the sector, from the following detailed description of two non-limiting examples of particular embodiments, with reference to the attached figures, of which:

FIG. 1 is a schematic side view of the internal body of a device, or cooling beaker, for cooling and/or thermal conditioning of a tubular object, according to one first embodiment of the present invention;

FIG. 1A is a schematic sectional view according to the plane A—A of the internal body of FIG. 1;

FIG. 3 is a schematic three-dimensional view of mechanical means for extracting the parisons from a plurality of cooling beakers according to a particular embodiment of the present invention;

FIG. 4 is a schematic side view of a second embodiment of a device according to the present invention;

FIG. 4A is a schematic sectional view according to the plane B—B of the device of FIG. 4.

DETAILED DESCRIPTION

Figure 1B:
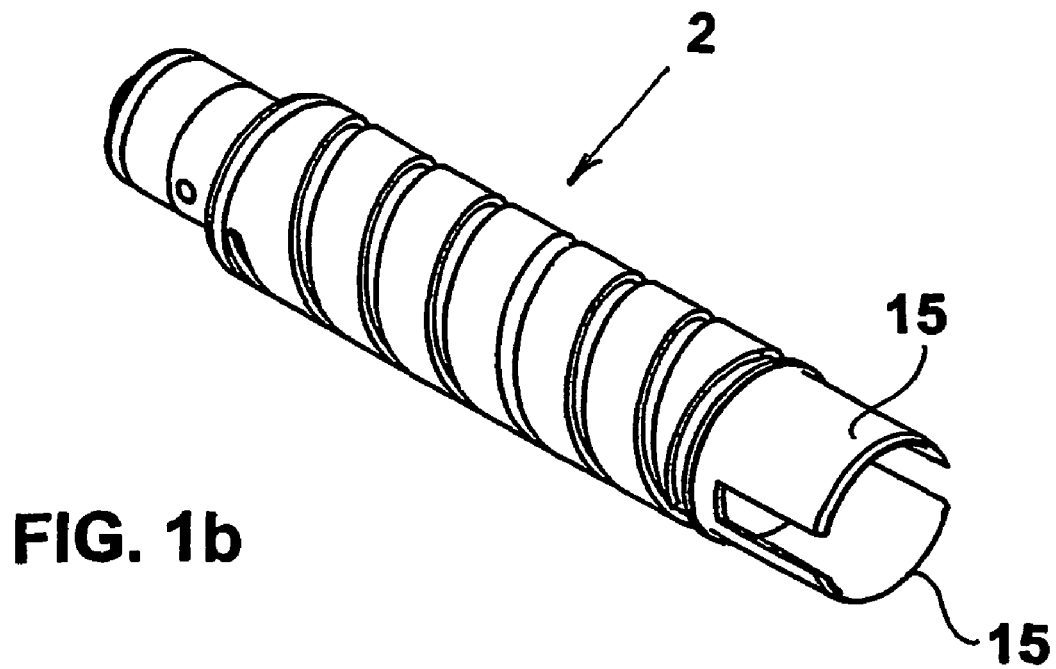
FIG. 1B is a schematic three-dimensional view of the internal body of FIG. 1.

FIGS. 1, 1A, 2, and 2A are schematic representations of one detail and of the ensemble of a first preferred embodiment of a device for the transport, cooling and/or thermal conditioning of tubular objects 6, in particular, parisons, according to the present invention. In what follows, the said device is as a whole designated by the reference number 1, and alternatively also referred to as "cooling beaker".

Cooling beakers of this sort, which in themselves are well known to the current art, are used for example to complete cooling of the parisons, outside the injection mould with which they were produced, so as to be able to increase the output rate of the press. The parisons are extracted from the injection mould when they are still relatively hot and in a state in which they are more plastic and deformable than at room temperature, but of a consistency such that they can be gripped, handled and moved. The beaker in FIGS. 2, 2A comprises an internal body 2 on which is inserted externally a sleeve 3 made, like the body 2, of a material that is a good thermal conductor and preferably light, such as aluminium. In the external surface of the internal body 2 there are made helical grooves 4 which, being closed by the sleeve 3, form channels for a coolant, for example water or some other appropriate fluid.

On its front side, the beaker 1 has an open front end 5 designed to enable introduction of a parison 6—or at least of its elongated portion 10—which is to be cooled or thermally conditioned, into an internal cavity 7 made in the internal body 2. The parison 6 of FIG. 2A comprises a portion in the proximity of the open end 8 on which there can be made, for example, the thread of the screw top of the future blow-moulded bottle, an annular projection for tearing seals and for fixing tear tabs of the aforesaid bottle top, and a second annular projection 9, also referred to in what follows as "ring", which typically also has the purpose of making possible gripping and movement of the blow-moulded bottle in the processing stations set downstream or in the user's plants. Frequently, but not necessarily for the purposes of the present invention, the ring is also the maximum radial projection of the region of the neck of the bottle (or anyway of the region close to the open end 8). In general, the threaded region and that of the ring on the parison 6 already, have the same dimensions that they will have on the blow-moulded bottle, whilst the elongated portion 10 and the rounded and closed end 11 of the parison 6 are sized in such a way that they can be dilated by blow-moulding and, possibly, by biaxial stretching so as to assume the dimensions of the finished is bottle or container. Since the present invention is particularly advantageous with parisons of elongated shape, in what follows the term "axial direction" or "longitudinal direction" shall mean the direction parallel to the larger dimension of the parison, and by "radial direction", "transverse direction" or "lateral direction" is meant the direction perpendicular to the larger dimension and to the axis of the parison or tubular object 6. From the state of the art there is already known a wide range of systems for bestowing on the elongated portion 10, which is initially inserted very hot and easily deformable into the cooling beaker, a shape with acceptable tolerances; for example, it is possible simply to leave a maximum play between the wall of the hot portion 10 to be expanded and the wall of the internal cavity 7 of the internal body, for instance of a few tenths of millimeter in the case of a parison that is approximately 150 mm long. Obviously, this play will be reduced to zero in the contact regions between the parison 6 and the walls of the internal cavity 7; i.e., the gap between the parison and the walls of the internal cavity 7 varies locally from region to region of the parison 6. This fact limits the axial bending of the portion 10 that is to undergo expansion.

The modalities of contact or otherwise of the rounded end 11 of the parison with the bottom 12 of the internal cavity 7 of the internal body, according to the known art, are numerous: for example, the end 11 of the hot parison can be brought into contact with the bottom 12, or else inserted at a distance and possibly brought into contact with the bottom 12, by deforming it in various ways or by sucking the entire parison towards the bottom 12.

According to certain solutions of the known art, the threaded end of the inserted parison 6 is allowed to project out of the beaker 1, in particular when the parison 6 is introduced into the cooling beaker 1, bringing to bear upon it the ring 9 or other radial projection of the parison. In this case, particularly with parisons like the one in FIG. 2A, with a part 13 close to the open end 8 having a tapered cross section which is narrower than the remainder 14 of the bulb, if the parison 6 is not, for example, constrained by a plug inserted inside it, the open end 8,13, if cooled too fast, frequently bends considerably, since the narrower part 13 cannot be contained by the walls of the internal cavity 7, and faulty parisons may be produced, with accentuated elbow-like bends in the vicinity of the open end 8. The applicant has encountered parisons of approximately 150 mm in length with errors of linearity of even 2–3 mm or more between the ends of the parison.

Other deformations of the parison can result from the operations of extraction from the injection mould and of transfer from this to the cooling beakers, all the more in that the current aim is to bring forward extraction and abbreviate the time for cooling the parison in the mould. In certain cases the parison can thus prove excessively plastic, whilst the accelerations, decelerations and impact during extraction, for example with mechanical grippers or the like, and movement towards the cooling beakers 1, can also lead to deformations that are unacceptable for the customer or for the subsequent production steps.

According to the present invention, the cooling beaker or device 1 is characterized in that it comprises containment means 15, represented in FIG. 1, designed to contain and/or reduce by contact the radial displacements of the open end 8 due to deformations of the parison 6, of thermal origin or deriving from the previous handling operations. In the preferred embodiment, represented in FIGS. 1, 1A, 2, the containing means 15 basically consist of a tubular portion with through lateral slits, so as to obtain a pair of prolongations on the front part 5 of the internal body 2, preferably in a position which is symmetrical with respect to a meridian plane of the beaker 1, the said slits extending in the longitudinal direction of the beaker. Without departing from the scope of the present invention, the front prolongations which provide the containing means 15 can even be just one, which embraces the open end of the parison 6 with a sufficient angle of envelopment, or else they may number more than two. This is obtained by producing an appropriate number of through slits on the wall of the tubular portion.

Figure 2:
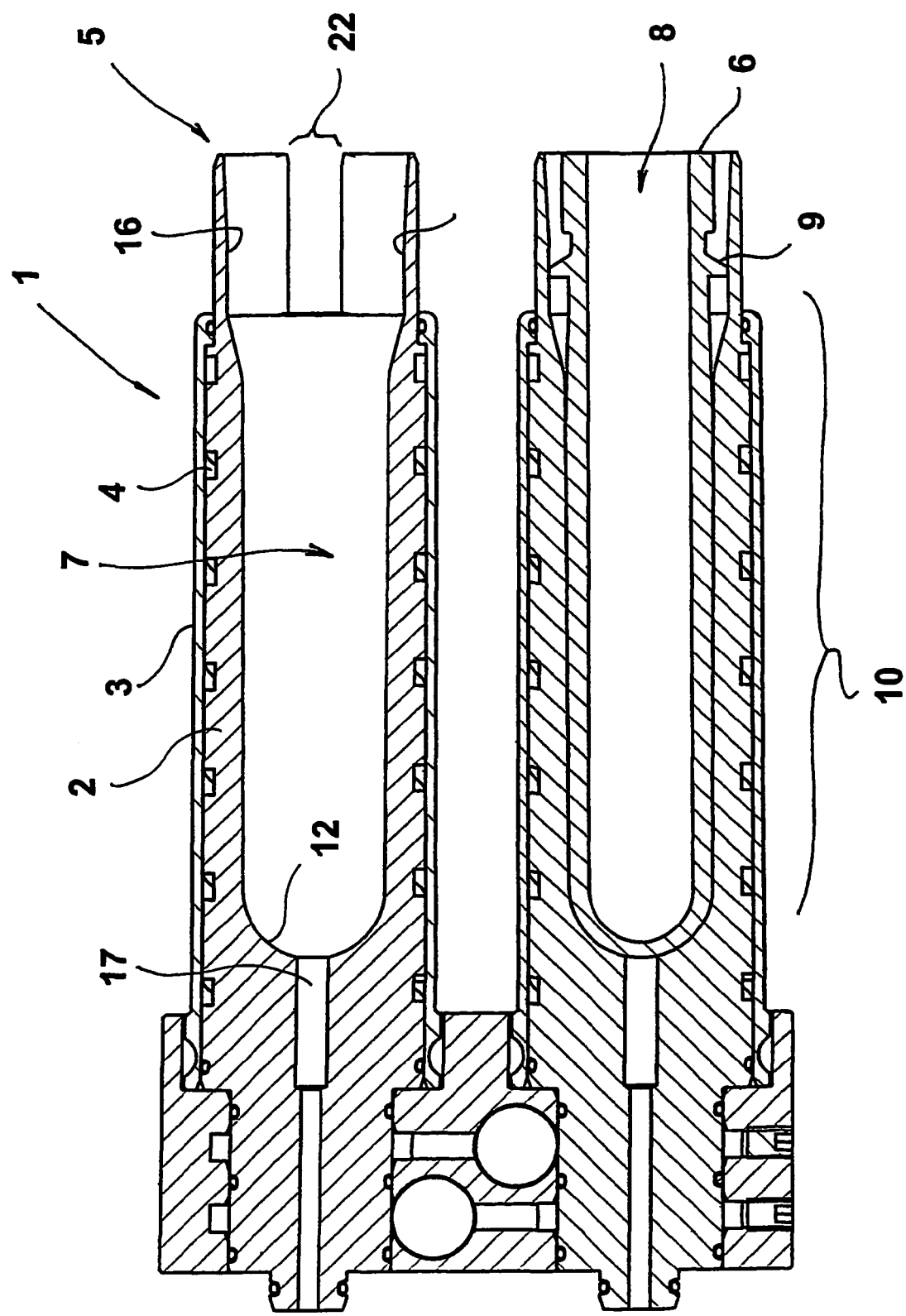
FIG. 2 is a schematic sectional view of two assembled devices, according to the embodiment of FIG. 1.
Figure 2A:
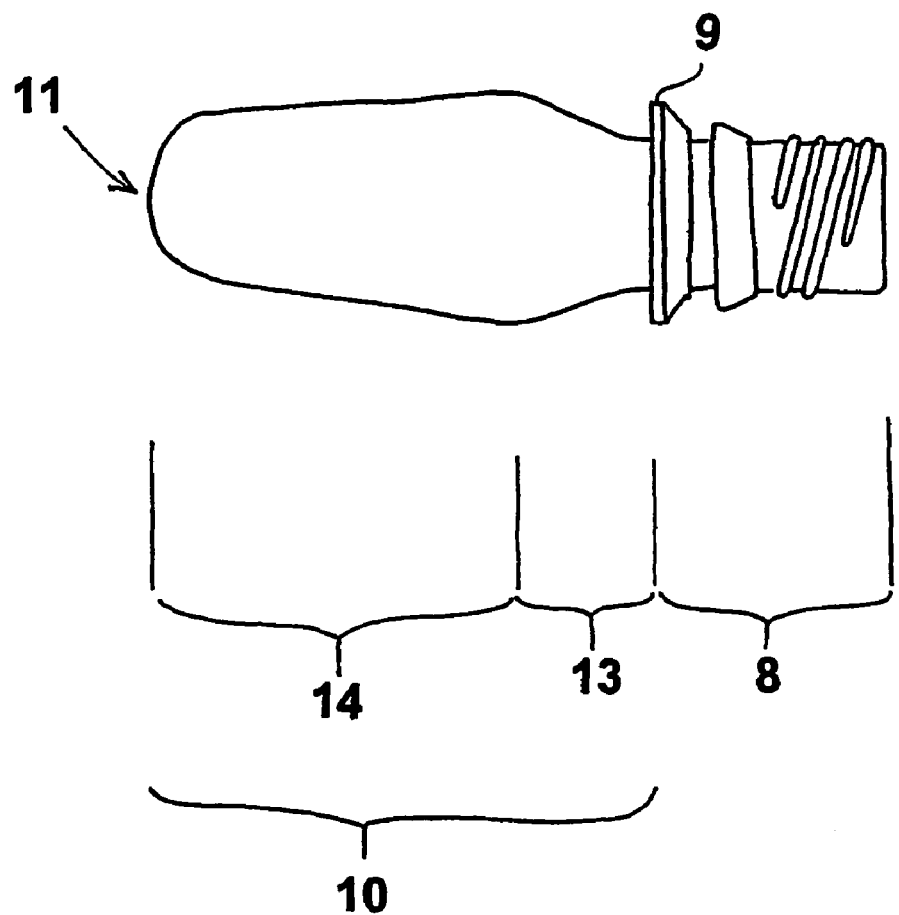
FIG. 2A is a schematic side view of a first example of parison.

The two prolongations 15 are shaped so as to define, on the inside of the beaker, supporting side surfaces 16, against which the open end 8 of the parison 6 can rest laterally, i.e., in the radial direction, following upon its deformation. In the example of FIG. 2A, each prolongation 15 defines a sector of substantially cylindrical surface, against which the annular edge of the collar or ring 9 (i.e., the part of the open end 8 of the parison that presents the maximum radial projection), or some other chosen region of the parison, comes to rest, undergoing deformation on account of thermal shrinkage.

The shape of the internal cavity 7 and of the lateral supporting surfaces 16, or else both of these, are defined, starting from the geometry of the parison 6 in such a way as to adapt them to one another.

The supporting surface or surfaces 16 are shaped and sized in such a way that, between the surface or surfaces and the section for supporting the parison, chosen for contact, is set at least one minimum radial gap, or also a maximum radial interference, of a pre-set value. The said minimum radial gap, or maximum interference, can be calculated with reference to the dimensions of a parison 6 of nominal dimensions and geometry or, equivalently, of a parison 6 at the temperature of extraction from the injection mould, for example a few tenths of millimeters of radial gap between the edge of the ring and the corresponding cylindrical surface of contact 16 made on the prolongations 15. In this case, advantageously a parison 6 can be inserted, by bringing its bottom 11 to bear upon the bottom 12 of the cavity 7, and, thanks to the cylindrical surface or surfaces 16, the ring 9 will be contained laterally, but is free to slide longitudinally owing to the thermal contraction caused by cooling.

Alternatively, the contact surface or surfaces 16 may be sectors of a flared surface or may have the shape of a truncated cone which opens towards the outside of the beaker 1, in order to allow also for the thermal reduction of the diameter, for example, of the ring 9 or other region of contact on the open end 8.

The devices as defined above make it possible, once inserted into the internal cavity 7, to straighten a parison 6 which is already deformed by heat as a result of a previous automatic manipulation, for example to transport it from the injection mould to the cooling beaker.

The surface above the cylindrical surface 16 (FIG. 2) advantageously—for example depending upon the ratio between the diameter of the elongated part of the parison and the external diameter of the ring—may form an ample flaring that opens outwards so as to constitute a lead-in for the parisons that are inserted into the cavity 7.

Advantageously, for example by aspirating the air inside the internal cavity 7 through the channel 18 open on the bottom 12 of the cavity, there is produced a negative pressure for increasing the rate of heat exchange between the parison 6 and the cooled internal body 2, notwithstanding the gap existing in some regions between the parison and the walls of the internal cavity 7. Initially, when the material of the parison 6 is still considerably plastic, the negative pressure deforms also the walls of the elongated portion 10, causing them to adhere to the walls of the internal cavity 7.

Figure 3A:
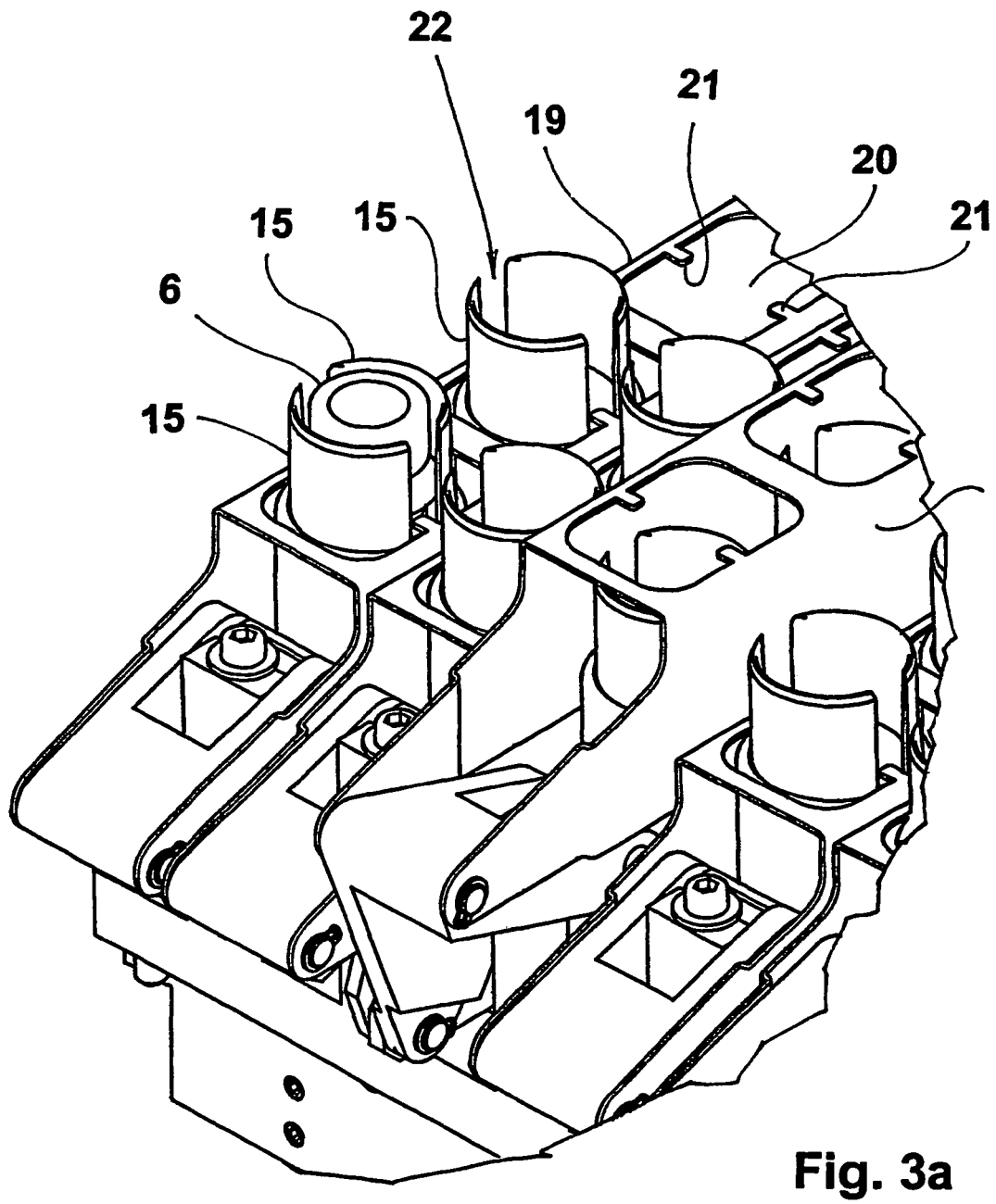
FIG. 3A is a detailed schematic view of the assembly made up of mechanical means for extraction and cooling beakers represented in FIG. 3.

FIGS. 3 and 3A are schematic representations of a further aspect of the preferred embodiment of FIG. 1. In accordance with the prior art, rows of a number of cooling beakers 1 are fixed on a plate or other support, which can be moved, for example, by a rotating arm. The reference number 18 designates as a whole the mechanical means for extracting the parisons from the internal cavities 7 of the beakers.

The mechanical means 18 comprise a number of extraction bars 19 that move in a longitudinal direction with respect to the beakers 1 and are actuated by a system of levers and hydraulic cylinders. Each extraction bar 19 comprises a plurality of holes or cutaway regions 20, through which the cross section of one or more beakers 1 can pass. Present on the edges of the cutaway sections 20 are two teeth 21, or some other similar type of radial projections, which are prolonged inside the beakers 1 through the longitudinal slits 22 that separate the two longitudinal prolongations 15 from one another and which, when the bars 19 are in the lowered position, are inserted under a region where there is a radial expansion of the cross section of the end 8 of a parison, for example under the ring 9. When a hydraulic cylinder is actuated, the corresponding extraction bar 19 is raised, translating parallel to itself along the axis of the beakers 1. The pairs of teeth 21 sliding in the slits 22 bear upon the rings 9, or other regions of radial expansion of the sections 8 of the parsons, and extract a row of parisons 6 from the corresponding beakers 1. The radial projections 21 may also have different shapes, even ones not resembling teeth, provided that they are capable of extracting the parisons 6 from the beakers 1.

Figure 4B:
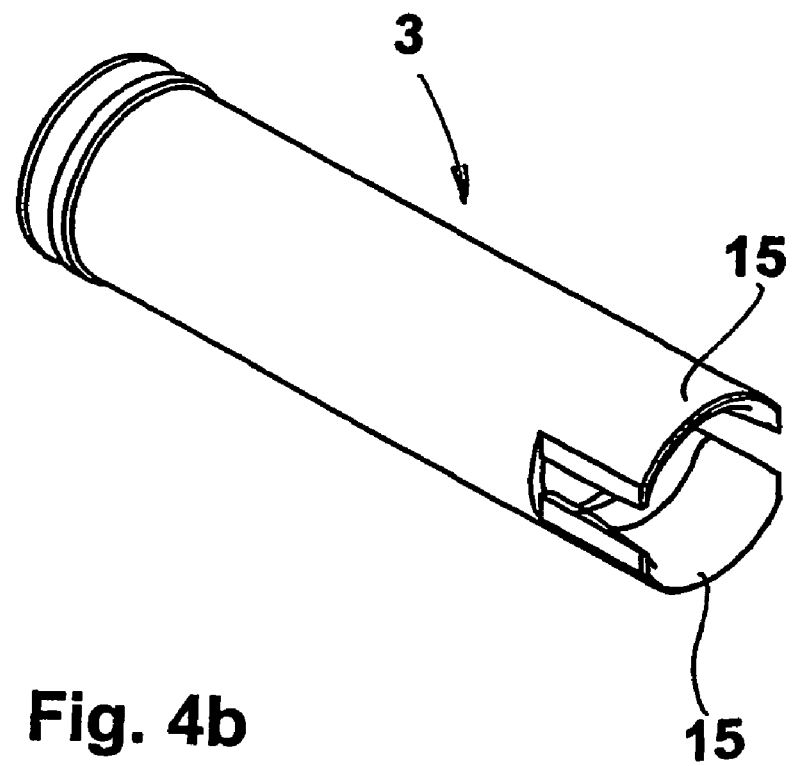
FIG. 4B is a schematic three-dimensional view of the external sleeve of the device of FIG. 4.
Figure 2B:
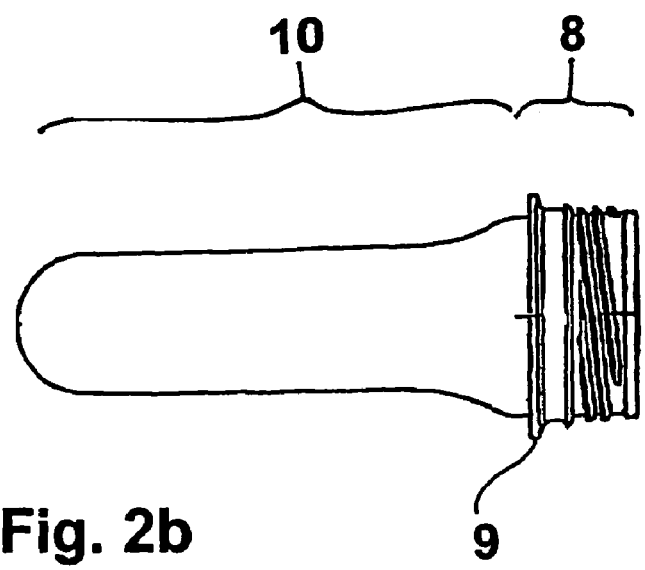
FIG. 2B is a schematic side view of a second example of parison.

FIGS. 4, 4A and 4B relate to a second preferred embodiment of the present invention, in which the tubular portion that forms a pair of prolongations 15 is obtained as a prolongation of the external sleeve 3 instead of the internal body 2. The criteria of sizing the internal cavity 7 of the internal body 2, and the determination of the gaps and of the play between the portion 10 of the parison that is to undergo expansion and the open end 8, and between the walls of the cavity 7 and the supporting surfaces 16 are similar to the preferred embodiment described previously. This second embodiment is simpler to produce, and can be mounted on a pre-existing internal body not provided with prolongations 15. In addition, a "change of format" can be obtained in a simpler way, in the sense that, by changing the external sleeve 3, an internal body 2 can house, for example, both a parison 6 for bottles with standardized rings having an external diameter of 28 mm, of the type illustrated in FIG. 2A, and a parison with a ring having a standardized external diameter of 38 mm, of the type illustrated in FIG. 2B.

Without departing from the scope of the present invention, the devices described above may undergo numerous modifications. For example, in addition to undergoing modifications that are within the reach of a person skilled in the sector, the said devices can find application in the thermal conditioning of parisons for containers or moulded objects made of materials other than polyethylene terephthalate, such as HDPE, PP, and PE.

The invention claimed is:

1. A device for post-mold cooling and/or thermal conditioning of a hot tubular object, outside the injection mold with which the tubular object was produced, provided with a first closed end and a second open end with a ring projecting radially from the cylindrical surface of the tubular object in the proximity of the second open end and constituting the maximum radial projection of the tubular object, wherein the device comprises:

a tubular internal cavity provided with an open end for the introduction of said tubular object, shaped to accommodate a first portion of said tubular object set in the proximity of the first closed end and to control the deformations thereof;

a tubular element is extended coaxial from the tubular internal cavity and the tubular element is shaped to accommodate a second portion of said tubular object in the vicinity of said second open end;

an internal supporting surface of the tubular element is shaped to contain and/or control, by means of contact on the ring the deformations that are produced, in a direction transverse to the axis, during cooling and/or thermal conditioning of said tubular object; and the internal supporting surface has a dimension such that, at the temperature of insertion of the hot tubular object into the internal cavity, there is set at least one minimum radial gap or a pre-set maximum radial interference.

2. The device according to claim 1, in which the tubular element is provided with at least one through longitudinal slit that forms a discontinuity in the internal supporting surface.

3. The device according to claim 1, in which the tubular internal cavity contains and constrains, at least partially, thermal deformations of the first portion of the tubular object, and is of diameter such as to produce, with the wall of the tubular object, a gap of a size not greater than a pre-set maximum amount after cooling.

4. The device according to claim 2, in which it comprises an internal body and a coaxial external sleeve fitted on the internal body.

5. The device according to claim 4, in which said tubular element constitutes an axial prolongation of the internal body.

6. The device according to claim 4, in which said tubular element constitutes an axial prolongation of the external sleeve.

7. The device according to claim 2, in which the internal supporting surface is substantially cylindrical.

8. The device according to claim 2, in which the internal supporting surface substantially has the shape of a truncated cone, and widens towards the open end of the device.

9. The device according to claim 2, in which mechanical means are provided for extraction of the tubular object from the tubular internal cavity.

10. The device according to claim 9, in which the mechanical means of extraction comprise a plate provided with a hole of diameter greater than the diameter of the tubular element and provided with at least one radial tooth designed to slide along said longitudinal slit for pushing the tubular object in the longitudinal direction.

11. A cooling tower for tubular objects wherein it comprises a plurality of cooling devices in accordance with claim 1.

12. The cooling tower according to claim 11, wherein there are provided mechanical extraction means comprising one or more extraction bars for extracting simultaneously a plurality of tubular objects from a corresponding plurality of said cooling devices.

* * * * *